United States Patent

[11] 3,572,910

| [72] | Inventor | Charles J. Koester<br>Sudbury, Mass. |
|---|---|---|
| [21] | Appl. No. | 809,781 |
| [22] | Filed | Mar. 24, 1969 |
| [45] | Patented | Mar. 30, 1971 |
| [73] | Assignee | American Optical Corporation<br>Southbridge, Mass. |

[54] APPARATUS FOR MEASURING THE REFRACTIVE ERRORS OF AN EYE
6 Claims, 3 Drawing Figs.

[52] U.S. Cl. .................................................. 351/13,
351/10, 351/16, 356/129
[51] Int. Cl. ...................................................... A61b 3/10
[50] Field of Search ......................................... 351/1, 6,
13, 10, 16; 356/124, 239, 129; 350/162

[56] References Cited
UNITED STATES PATENTS

| 1,552,055 | 9/1925 | Holmes | 351/13 |
|---|---|---|---|
| 1,590,532 | 6/1926 | Lenouvnel | 356/239 |
| 2,049,222 | 7/1936 | Reason | 351/13X |
| 2,114,984 | 4/1938 | Reason | 351/6 |
| 2,977,847 | 4/1961 | Meyer-Arendt | 356/129 |
| 3,246,557 | 4/1966 | Mentz et al. | 350/162 |

*Primary Examiner*—David Schonberg
*Assistant Examiner*—Paul A. Sacher
*Attorneys*—William C. Nealon, Noble S. Williams and Robert Bird ABSTRACT: Apparatus for determining refractive errors of a patient's eye including means for projecting an image of a white light source pattern which is wavelength-dispersed into said eye and onto the retina thereof and means for enabling a refractionist or the like to observe the wavelength recombined image reflected by the retina for determining the sharpness of focus thereof. During the observation, the apparatus is adjusted to focus the image for maximum sharpness upon the retina and the amount of focusing required from a normal eye refraction position measured to determine the refractive error of the patien's eye.

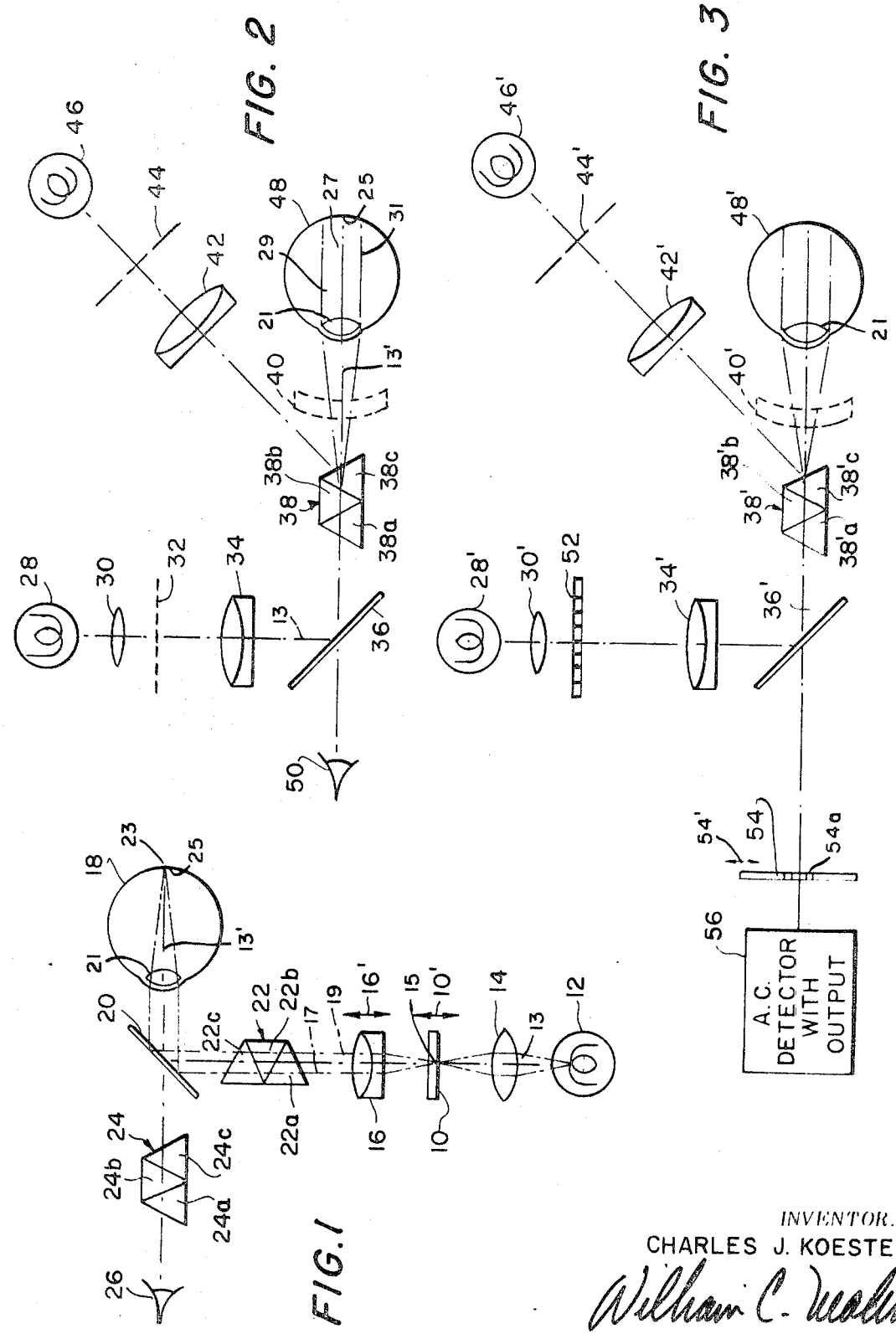

APPARATUS FOR MEASURING THE REFRACTIVE ERRORS OF AN EYE

BACKGROUND OF THE INVENTION

1. Field of the Invention

The invention relates generally to apparatus for determining refractive error of an eye and more particularly to an apparatus which avoids the requirement of and tendency for subjective responses from the patient being examined.

2. Prior Art

Refractive error measuring apparatus in use presently requires the patient to give subjective responses to questions concerning the relative merits in respect to sharpness of vision for one or more lenses placed between him and an image he is observing. One commonly used type of apparatus for such subjective use is the refractor. The drawback of using apparatus requiring such subjective tests is the lack of precision in the patient's evaluation of the sharpness of focus produced by certain corrective lenses placed before him during the use of the above described apparatus.

Another commonly used apparatus for measuring refractive error objectively in the patient's eye requires focusing by the examiner during a long time duration in which an image is projected onto the fundus of the patient's eye. During this long time duration it is quite natural for the patient to attempt accommodation to the out of focus image, which is usually one he recognizes although not observing it in as sharp focus as is possible with an emmetropic eye.

A still further presently used apparatus for measuring refractive error makes use of an infrared target in order to prevent uncontrolled accommodation by the patient. However, this system suffers from the drawback of a poor signal to noise ratio and also chromatic aberration since there is a different refraction for the infrared and visible parts of the spectrum. For instance, transmittance of ocular media is better in the visible portion of the spectrum than it is in the infrared portion of the spectrum.

SUMMARY OF THE INVENTION

Accordingly, it is an object of the present invention to provide apparatus which avoids use of subjective responses from the patient while refractive errors of the patient's eye are being measured. A further object is to provide apparatus which presents to the patient a light image but which image is such as not to influence the patient to accommodate during the test.

These and other objects are accomplished in one embodiment of the invention wherein apparatus is provided for determining refractive errors of a patient's eye by the use of means for projecting a white light pattern which is wavelength-dispersed onto the retina and fundus of the patient's eye and means for enabling the refractionist or examiner to observe a wavelength recombined or reconstructed image thereof for sharpness of focus. During the observation, the image is sharpened in focus and the amount of focusing required therefor from the normal or zero adjustment of the apparatus is measured. The image dispersement and recombination or reconstruction are accomplished by use of an Amici-dispersing prism and the test can be performed while the patient's attention and vision are directed to a fixation target.

BRIEF DESCRIPTION OF THE DRAWINGS

Other objects, features and advantages of the invention will be apparent from the following more detailed description of the invention wherein:

FIG. 1 is a schematic representation of apparatus according to one embodiment of the present invention in which two prism groups are used, one for dispersion of light being directed into the patient's eye and imaged upon the retina thereof and one for the recombining of the dispersed light reflected by the retina;

FIG. 2 is a schematic representation of apparatus according to a further embodiment of the present invention wherein the same prism group is used for both the dispersion and the recombining of such image-forming light; and FIG. 3 is a schematic representation of a still further embodiment of the present invention wherein a Ronchi ruling is used with such apparatus to generate an AC signal, whose maxima appear when the target image-forming light is best focused upon the retina.

DESCRIPTION OF PREFERRED EMBODIMENTS

The present invention features apparatus for preventing the patient from accommodating to a slightly out-of-focus target pattern in order to bring it into focus during eye refraction by a doctor or the like. The patient is presented with a wavelength-dispersed image of the target pattern by the apparatus which features an illuminated target, means for illumination of the target including a white light source, a condenser lens means, a collimator for carrying or projecting the image-forming light rays towards the patient's eye, a beam splitter, a dispersing prism group, and a collecting or recombining prism group, and in at least one embodiment one prism group may function as both the dispersing means and the recombining means.

The apparatus of FIG. 1 is operated by white light from a light source 12 which has light rays therefrom condensed by a condenser lens 14 spaced therefrom along an optical axis 13 so as to illuminate an aligned target 10, whose image is then projected by collimator 16 as indicated by parallel rays 17 and 19 from object point 15 and is wavelength-dispersed by a prism group 22 before impinging upon a beam splitter mirror 20 for reflection along optical axis 13' into the patient's eye 18 disposed at a predetermined eye-examination position of said apparatus. Thus, the collimating lens 16 and lens 21 of the patient's eye function jointly in forming an image of the target within the eye and substantially at location 23 adjacent the retina 25 thereof if the eye is a normal or emmetropic eye. However, this image is laterally wavelength-dispersed due to the presence of the prism group 22.

The wavelength-dispersed image reflects back from the retina through the beam splitter 20 and through collecting recombined prism group 24 after which the reconstructed or collected image is viewed by the examiner 26. If the image at the retina is out-of-focus as observed by the examiner at the viewing station 26, he may then adjust the axial position of either target 10 or collimator 16, or both, as indicated by arrows 10' and 16' respectively. The image of the target is therefore moved into the plane of the retina and the amount of focusing or moving of the elements 10 and/or 16 is used to measure the refractive error of the patient's eye 18.

As already stated, the function of prism group 22 is to disperse entering light into wavelength components at the retina that are meaningless to the patient and thus avoids any controlled or uncontrolled attempt on his part at accommodation. If we consider the prism group 22 of FIG. 1 to be an Amici group with prisms 22a and 22c being of low index of refraction relative to prism 22b, one wavelength of the light near the middle of the spectrum will exit from the Amici group 22 with substantially zero axial deviation, and the light of each of the other wavelengths will be displaced different amounts from the optical axis of the system.

Accordingly, if, for the moment, attention is directed to FIG. 2 wherein optical components substantially like those already described in FIG. 1 are shown, it will be readily appreciated that when white light from the target 32 is directed through the collimator as substantially parallel rays and then through the prism group, this white light will be dispersed by the prism group into its component colors or wavelengths. Thus, light rays of a wavelength near the middle of the visible spectrum (such as yellow rays) will be substantially upon the axis 13' when focused at the retina such as indicated by dot-dash line 27 for the mean yellow ray while the mean blue ray is indicated by the dot-dash line 29 and the mean red ray is indicated by dot-dash line 31.

More details of dispersion imaging can be found in copending application Ser. No. 534,214, which issued Jun. 10, 1969, as U.S. Pat. No. 3,449,037, is assigned to American Optical Corporation, is by the same inventor Charles J. Koester and is incorporated herein by reference.

The light dispersed by group 22 then impinges upon beam splitter mirror 20 and is reflected to the eye of the patient 18. Since the image or light is fragmented, the patient does not respond with uncontrolled accommodation to hamper the measurement being performed. The dispersed image is reflected by the retina through beam splitter 20 to prism group 24 which performs a reverse operation from that performed by the group 22. That is, the dispersed light or image is recombined as it travels through the prism system 24, which may be an Amici group as described previously herein, with its operation in reverse due to its orientation. The recombined image is then observed by the examiner 26 and the focusing adjustments made with target 10 or collimator 16 (or both), in order to determine the refractive error in the eye 18 of the patient.

The embodiment of FIG. 2 is similar to that described for FIG. 1 with a light source 28 sending light to condenser lens 30 and then to a target 32, whose image is collimated by collimator 34. The light or image then reflects from beam splitter 36 to prism group 38 which disperses the image before it proceeds to the eye 48 of the patient. The reflection of the dispersed image from the retina of the patient's eye 48 then travels in the reverse direction through the prism group 38 to beam splitter 36. The reverse travel through the prism group 38 causes the image to be recombined before going to the examiner's eye 50. In this way, the group 38 acts as both a dispersing and combining system for the apparatus of FIG. 2.

It should be noticed that a second light source 46 is provided to project a fixation target 44 through a collimator 42 to a reflecting portion of the surface of prism group 38 to impinge upon the retina of the eye 48 in order to provide the patient with a recognizable target to control his accommodation. Such a fixation target could also be provided in the system described according to FIG. 1. The actual measurement of the system of FIG. 2, or any other system according to the present invention, may be made by provision of a series of correcting lenses 40, such as that provided by a refractor. Such an instrument provides a basis for the examiner determining which correcting lens provides the clearest image, and therefore what refractive correction is necessary. Such a procedure is distinguishable from many of the systems presently used for measuring refractive error in that subjective responses of the patient are not solicited, since the patient observes only a dispersed image of target 32 and a bright overall glow from fixation target 44.

A further embodiment of the invention may be described with reference to FIG. 3 wherein the system of FIG. 2 is reproduced in its entirety except for the provision of a Ronchi ruling 52 in the plane of the target, and parallel slits 54 to provide an AC detector 56 with an input of an AC signal having maxima and minima, which may be displayed, or in some other way made an output of the AC detector system 56. Such apparatus is operated to generate a signal or other output when the AC signal is maximum, which in turn is caused when the target 52 is focused on the fundus. In the system according to FIG. 3, as well as in other systems and arrangements according to the present invention, the target should not contain lines parallel to the direction of dispersion. Furthermore, if it is desirable to have sets of lines at various angles for the target, as in testing for axis of astigmatism, it is merely necessary to assure that the direction of dispersion does not lie parallel to one of the sets of lines.

It should be further understood that the fixation targets 44 or 44' can be an illuminated pinhole to produce collimated light; however, other fixation targets and other arrangements are contemplated for projecting a target into the patient's eye.

As will of course be understood by those skilled in the art, some element or elements of the dynamic system which FIG. 3 is, must move as indicated by double-headed arrow 54' in order to generate an AC signal. Which element moves is within the purview of the skilled designer although I suggest provision for moving the light beam before it passes through element 54. Such movement may be accomplished, for example, by vibrating a mirror in the light beam.

Also, I above mention use of my invention in testing for astigmatism. I allude to the conventional radial line pattern. An alternative system calls for a set of Ronchi lines rotatable about the instrument axis. This allows two comparative readings to be made, one parallel to and one normal to the axis of astigmatism thereby providing more definitive information on the axis and amount of astigmatism.

I claim:

1. Apparatus for use by an examiner in measuring the refractive error of a patient's eye, said apparatus comprising a target, means for illuminating said target with white light, axially movable lens means aligned with said target and positioned so as to focus upon said target and project a beam of substantially parallel light from said target along a predetermined projection path and into said eye when located at an eye-examination position of said apparatus, said lens means and the lens of the eye being examined jointly serving to form an image of said target at a focal plane within said eye and adjacent the retina thereof and such that the amount of axial movement of said lens means is a function of the refractive power of the eye being examined, light-dispersion means having at least a part thereof disposed in said path between said lens means and said eye-examination position for so laterally dispersing the component wavelengths of the light forming the image of said target at said focal plane as to be unrecognizable by said patient, and beam-splitting means so positioned and arranged in said projection path between said lens means and said eye-examination position as to receive component wavelengths of dispersed light reflected by said retina back along said projection path and to direct a part thereof along a different path to an observation position, said light-dispersion means being positioned so as to recombine the reflected dispersed light before it reaches said observation position.

2. The invention according to claim 1 and wherein said apparatus further includes a fixation target for observation by said patient while looking along a part of said projection path.

3. The invention according to claim 1 and wherein space is provided between said eye-examination position and said dispersion means for a corrective lens to be placed in said path during refracting measurements of said eye.

4. The invention according to claim 1 and wherein said target comprises a Ronchi ruling and there is provided at said observation station means for receiving light reflected from the retina of the eye being examined and for indicating conditions of maximum light reflection therefrom.

5. The invention according to claim 1 wherein said means for detection includes a diaphragm and an AC detection apparatus, wherein said diaphragm transmits a maximum whenever said Ronchi ruling is focused on said retina, and wherein said maximum is detectable by said AC detection apparatus.

6. The apparatus of claim 1 including a set of Ronchi lines rotatable about the instrument axis, said set of lines arranged to allow comparative readings to be made, one parallel to and one normal to the axis of astigmatism thereby providing information on the axis and amount of astigmatism.